United States Patent [19]

Endo

[11] Patent Number: 5,489,992
[45] Date of Patent: Feb. 6, 1996

[54] CONTACT IMAGE SENSOR WITH CONTINUOUS LIGHT SOURCE POSITIONED ADJACENT TO DETECTION OBJECT

[75] Inventor: Takafumi Endo, Amagasaki, Japan

[73] Assignee: Mitsubishi Denki Kabushiki Kaisha, Tokyo, Japan

[21] Appl. No.: 334,344

[22] Filed: Nov. 2, 1994

[30] Foreign Application Priority Data

Dec. 9, 1993 [JP] Japan ..................... 5-308454

[51] Int. Cl.⁶ ................ H04N 1/04; H01J 40/14
[52] U.S. Cl. ............ 358/482; 358/483; 358/484; 250/208.1
[58] Field of Search ................ 358/482, 483, 358/518, 484, 471, 498, 496, 400, 473, 497; 250/208.1, 216; 350/96.27; 348/294

[56] References Cited

U.S. PATENT DOCUMENTS

| | | | |
|---|---|---|---|
| 4,644,155 | 2/1987 | Mochizuki et al. | 250/277 |
| 5,142,356 | 8/1992 | Usami et al. | 358/518 |
| 5,187,596 | 2/1993 | Hwang | 358/484 |
| 5,229,596 | 7/1993 | Ujihara . | |
| 5,233,178 | 8/1993 | Tokunaga . | |
| 5,254,847 | 10/1993 | Hata et al. . | |

FOREIGN PATENT DOCUMENTS

| | | |
|---|---|---|
| 0457623 | 11/1991 | European Pat. Off. . |
| 0543609 | 5/1993 | European Pat. Off. . |
| 0596715 | 5/1994 | European Pat. Off. . |
| 59-061266 | 4/1984 | Japan . |
| 5110760 | 4/1993 | Japan . |
| 5344277 | 12/1993 | Japan . |
| 2255684 | 11/1992 | United Kingdom . |

Primary Examiner—Edward L. Coles, Sr.
Assistant Examiner—Allan A. Esposo
Attorney, Agent, or Firm—Rothwell, Figg, Ernst & Kurz

[57] ABSTRACT

A contact image sensor has in an upper portion of a housing a rod-like continuous light source for emitting light directly to an object. The continuous light source is coated, over its entire outer glass surface, except at an irradiating portion, with a black paint to eliminate irradiation of unnecessary light. Inside the housing, there are accommodated a condenser lens for concentrating the reflected light from the object, and a sensor board on which sensor chips and various electronic components such as logic ICs are arranged, each sensor chip being composed of a light-receiving portion for receiving the light concentrated by the condenser lens and a driver circuit. The passageway of the reflected light from the object is occupied by a transparent resin to prevent any foreign matter from entering from the surroundings.

15 Claims, 5 Drawing Sheets

CONTACT IMAGE SENSOR WITH CONTINUOUS LIGHT SOURCE POSITIONED ADJACENT TO DETECTION OBJECT

BACKGROUND OF THE INVENTION

1. Field of the Invention

This invention relates to a contact image sensor for carrying out a reading operation in a facsimile, scanner, etc., and more particularly to an improved sealed structure for a light emitting light source as well as for a contact image sensor.

2. Description of the Related Art

FIG. 9 of the accompanying drawings is a cross-sectional view of a prior art contact image sensor disclosed in Japanese Patent Laid-Open Publication No. HEI 5-110760. The prior art contact image sensor comprises a housing 1, a rod-like light source 2 fixed to a detachable part 3 of the housing 1, a condenser lens 4, an image sensor 5, a glass plate 6, and a circuit board 7.

The operation of the prior art contact image sensor will now be described.

The light emitted from the rod-like light source 2 passes the glass plate 6 and is irradiated onto a detection surface of a detection object or document 8. Depending on the brightness of color of the document 8, a white surface reflects the light. The reflected light passes through the glass plate 6, is concentrated by the condenser lens 4, and is received by a light-receiving portion of the image sensor 5. Characters, etc. of the document 8 can then be read by the circuit board 7.

The glass plate 6 partitions the interior of the housing 1 from the exterior to prevent any foreign matter from the document 8 or surroundings from entering, thus securing the precision of the sensor and also serving as a support table for the document 8.

However, in the prior art contact image sensor, since the rod-like light source situated inwardly of the glass plate, which prevents the invasion of any foreign matter as mentioned above, is spaced apart from the document by a relatively large distance, a high-brightness light source is required to prevent the lowering of illumination efficiency.

Further, in order to allow the light to be irradiated onto the document or reflected back from the document and also in order to prevent any foreign matter from coming into the contact image sensor, a part of the contact image sensor must be covered with a transparent cover such as a glass plate.

SUMMARY OF THE INVENTION

It is therefore an object of this invention to provide a contact image sensor which can lower the necessary degree of brightness of a light source without deteriorating the reading precision, and which can prevent the invasion of any foreign matter without using a transparent cover.

In order to accomplish the above object, according to a first aspect of the invention, there is provided a contact image sensor comprising: at least one continuous light source for emitting light to a detection object while the detection object is conveyed along a guide; a lens for receiving and concentrating the light reflected by the detection object; a sensor board on which a number of light receiving portions for receiving the light from the lens are arranged; and a housing for supporting the continuous light source, the lens and the sensor board; the continuous light source being adapted so as to be located close to the detection object.

According to a second aspect of the invention, the passageway of the reflected light from the detection object to the lens is filled with a transparent resin member.

According to a third aspect of the invention, the passageway of the reflected light from the detection object to the lens is closed by a glass plate from the inner side of the housing.

According to a fourth aspect of the invention, the continuous light source is located on a detection-object-discharge side of the lens and has an irradiating portion for emitting light, the irradiating portion being provided by machining an upper portion of the detection-object-discharge-side end of the continuous light source.

According to a fifth aspect of the invention, the transparent resin member has on its detection-object-side surface a projection.

The projection may be an integral part of the transparent resin member.

Alternatively, the projection may be a semi-spherical plastic or glass member.

According to a sixth aspect of the invention, light passing through light source side of the irradiating portion of the continuous light source is restricted.

In operation, in the contact image sensor of this invention, light from the continuous light source is irradiated directly onto the detection object. The reflected light from the detection object is concentrated by the lens and then received by the sensor board so that the light is photoelectrically converted to obtain a voltage output.

With the first arrangement of the invention, since the continuous light source is located close to the detection object, it is possible to lower the degree of brightness of the light source without deteriorating the reading precision.

With the second arrangement, since the passageway of the reflected light from the detection object to the lens is filled with the transparent resin member, it is possible to prevent any foreign matter from entering from the passageway.

With the third arrangement, since the passageway of the reflected light from the detection object to the lens is closed by the glass plate from the inside of the housing, it is possible to prevent any foreign matter from entering from the passageway.

With the fourth arrangement, partly since the continuous light source is located on a detection-object-discharge side of the lens and has an irradiating portion for emitting light, and partly since the irradiating portion is provided by machining an upper portion of the detection-object-discharge-side end of the continuous light source, it is possible to irradiate light onto the detection object and it is possible to prevent the detection object from hitting the irradiating portion of the continuous light source while the detection object is conveyed, thus making it difficult to cause jamming of the document.

With the fifth arrangement, because of the projection, it is possible to prevent the reflected light from the detection object from dispersing.

With the sixth arrangement, since light passing from light source side of the irradiating portion of the continuous light source is restricted, it is possible to emit uniform light from the irradiating portion.

DETAILED DESCRIPTION

Several preferred embodiments of this invention will now be described with reference to the accompanying drawings.

EMBODIMENT 1

Figure 1:
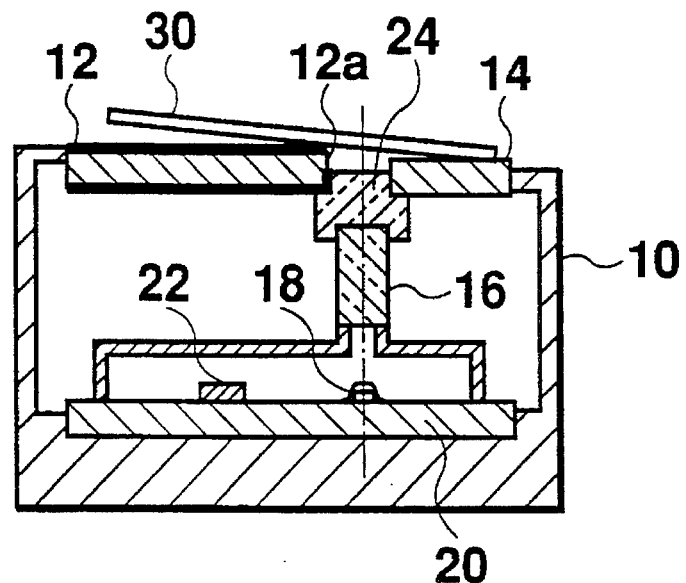
FIG. 1 is a cross-sectional view of a contact image sensor according to a first embodiment of this invention.

FIG. 1 is a cross-sectional view of a contact image sensor according to a first embodiment of the invention. As shown in FIG. 1, in an upper portion of a housing 10, there are accommodated a rectangular cross-section continuous light source 12 for emitting light directly to a detection object or document 30, and a document guide 14. The continuous light source 12 is coated, over its entire outer glass surface except an irradiating portion 12a located at one end of the continuous light source 12, with black paint to eliminate irradiation of unnecessary light. Inside the housing 10, there are arranged a condenser lens 16 for concentrating the reflected light from the document 30, and a sensor board 20 on which sensor chips 18 as light-receiving devices are arranged, each sensor chip being composed of a light-receiving portion for receiving the light concentrated by the condenser lens 16 and a driver circuit. On the sensor board 20, there are supported various electronic components 22 such as an amplifier for converting the light received by the individual sensor chips 18 into respective image signals, chip resistors, chip capacitors, and logical ICs. The passageway, which is defined by the continuous light source 12 and the document guide 14, of the light reflected from the document 30 is filled with a transparent resin member 24 such as epoxy resin, silicone resin or plastics, partitioning the interior of the housing 10 from the exterior. In this embodiment, the transparent resin member 24 is fixed to the continuous light source 12, the document guide 14 and the condenser lens 16, thereby fixing the continuous light source 12 and the document guide 14 to the housing 10. Since the continuous light source 12 and the condenser lens 16 are thus fixed, it is possible to prevent the light path from deviating.

The characteristic feature of this embodiment is that the continuous light source 12 is situated adjacent to the document 30 so that the document 30 can be read without lowering the reading precision even if the degree of brightness of the continuous light source 12 is suppressed.

Further, since the passageway of the reflected light is occupied by the transparent resin member 24, a sealed structure can be obtained even if the upper surface of the housing is not covered with a glass plate or the like. It is therefore possible to prevent any foreign matter from entering from the document 30 or surroundings.

The operation of the contact image sensor will now be described.

The light emitted from the irradiating portion 12a of the continuous light source 12 is irradiated onto the document 30. The document 30 is conveyed while being in contact with the upper portion of the continuous light source 12. The rectangular cross-section continuous light source 12 is exposed from the housing 10 and serves as a document guide. Since the irradiating portion 12a is situated close to the document 30, it is possible to secure an adequate degree of irradiation to the document 30 even if the degree of brightness of the continuous light source 12 is low. The irradiated light will be absorbed by the black areas and hence will scarcely be reflected there. On the other hand, the irradiated light will substantially be 100% reflected from the white areas. The reflected light is concentrated by the condenser lens 16 via the transparent resin member 24. The light concentrated by the condenser lens 16 is received by the light-receiving portions of the sensor chips 18 on the sensor board 20, so the individual light-receiving portion converts the light into electricity to produce a voltage output. Usually, each sensor chip 18 has a 64-bit light-receiving portion. The sensor chips 18 are arranged in a row; for example, in the case of a contact image sensor for a A4-size document, it has receiving portions of 1728 bits. The voltage outputs will be produced one after another by the driver circuits of the respective sensor chips 18 according to the reading cycle. The photoelectrically converted electrical signals will then be outputted to the exterior via non-illustrated connectors.

As mentioned above, in this embodiment, the continuous light is situated close to the document 30. In the case of an ordinary light source, the distance between the light source and the document must be more than 10 mm in order to eliminate illumination ripple. In the case of a continuous light source, however, only a small amount of illumination ripple exists, and so it is theoretically possible to reduce the ripple to zero. Accordingly, in this embodiment, it is possible to bring the irradiating portion 12a close to the document 30 by using the continuous light source 12.

With this embodiment, since the continuous light source 12 is situated close to the document 30, it is possible to reduce the degree of brightness of the continuous light source 12. Otherwise, assuming that the degree of brightness is kept as in ordinary use, it is possible to obtain a much higher degree of illumination and hence to increase the contrast. Further, since the continuous light source 12 is not mounted inside the housing 10, maintenance actions, such as exchange of the light source, can be carried out without difficulty.

Since the transparent resin member 24 allows the reflected light from the document 30 to pass through, and occupies the gap between the continuous light source 12 and the document guide 14, it is possible to prevent any foreign matter from entering from the surroundings.

In this embodiment, the document guide 14 is situated downstream of the continuous light source 12 in order to streamline the discharging of the document 30. More specifically, partly since the height of the document guide 14 is smaller than that of the continuous light source 12 upstream of the document guide 14 and partly since the difference in height between the document guide 14 and the transparent resin member 24 is reduced, it is possible to prevent the document from jamming.

EMBODIMENT 2

Figure 2:
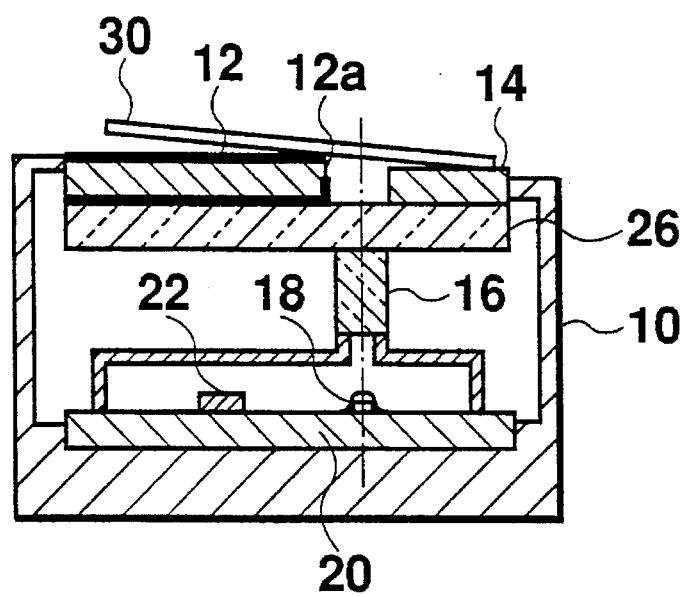
FIG. 2 is a cross-sectional view of a contact image sensor according to a second embodiment.

FIG. 2 is a cross-sectional view of a contact image sensor according to a second embodiment of this invention. In this and other following embodiments, parts or elements similar to those of the first embodiment are designated by like reference numerals.

As shown in FIG. 2, the characteristic feature of the second embodiment is that the passageway of the reflected light from the document 30 is closed by a glass plate 26 from the inner side of the housing 10.

Accordingly the glass plate 26 prevents any foreign matter from entering from the surroundings. Further, the glass plate 26 supports the continuous light source 12 and the document guide 14 from their lower side and fixes the continuous light source 12 and the condenser lens 16, so that the light path can be prevented from deviating.

The operation of the second embodiment is identical with that of the first embodiment, and therefore its description is omitted here.

In the second embodiment, similarly to the first embodiment, if the continuous light source 12 is situated close to the document 30, it is possible to lower the degree of brightness of the continuous light source 12. Otherwise, if the degree of brightness is kept as in ordinary use, it is possible to obtain a much higher degree of illumination and hence to increase the contrast. Further, since the continuous light source 12 is not mounted inside the housing 10, maintenance work, such as exchange of the light source, can be carried out without difficulty.

EMBODIMENT 3

Figure 3:
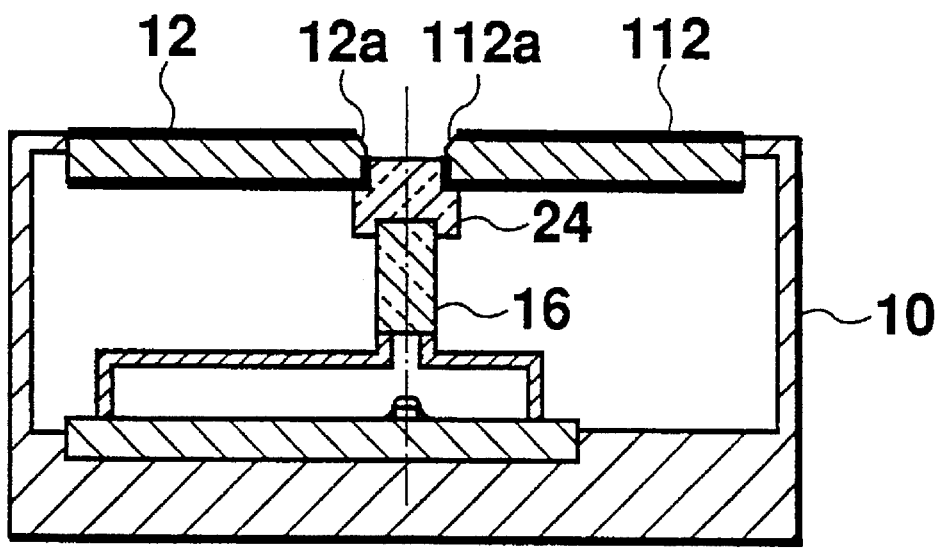
FIG. 3 is a cross-sectional view of a contact image sensor according to a third embodiment.

FIG. 3 is a cross-sectional view of a contact image sensor according to a third embodiment of this invention. In this embodiment, as shown in FIG. 3, two continuous light sources 12, 112 are situated one on each upper side of the condenser lens 16 on the upper surface of the contact image sensor. Each continuous light source 12, 112 has an irradiating portion 12a, 112a which is formed by chamfering an upper end portion of the light source 12, 112.

In this embodiment, with the thus chamfered continuous light source 12, 112, it is possible to irradiate light onto the document 30. Further, since the continuous light 112 situated on the downstream side is partially chamfered at an end portion toward the condenser lens 16, i.e., the upstream side, it is possible to prevent the document 30 from jamming.

The operation of the third embodiment is identical with that of the first embodiment and therefore its description is omitted here.

Accordingly, in the third embodiment, the irradiating portion 112a serves to prevent a document from jamming. Since the continuous light sources 12, 112 are situated close to the document 30, similarly to the first embodiment, it is possible to lower the degree of brightness of the continuous light sources 12, 112. Otherwise, if the degree of brightness of the continuous light sources 12, 112 is kept as in ordinary use, it is possible to obtain a much higher degree of illumination and hence to increase the contrast. More particularly, since the two continuous light sources 12, 112 are used, it is possible to increase the contrast much more. Further, since the continuous light source 12 is not mounted inside the housing, maintenance work, such as exchange of the light source, can be carried out without difficulty.

Since the transparent resin member 24 allows the reflected light from the document 30 to pass through and occupies the gap between the continuous light source 12 and the document guide 14, it is possible to prevent any foreign matter from entering from the surroundings.

EMBODIMENT 4

Figure 4:
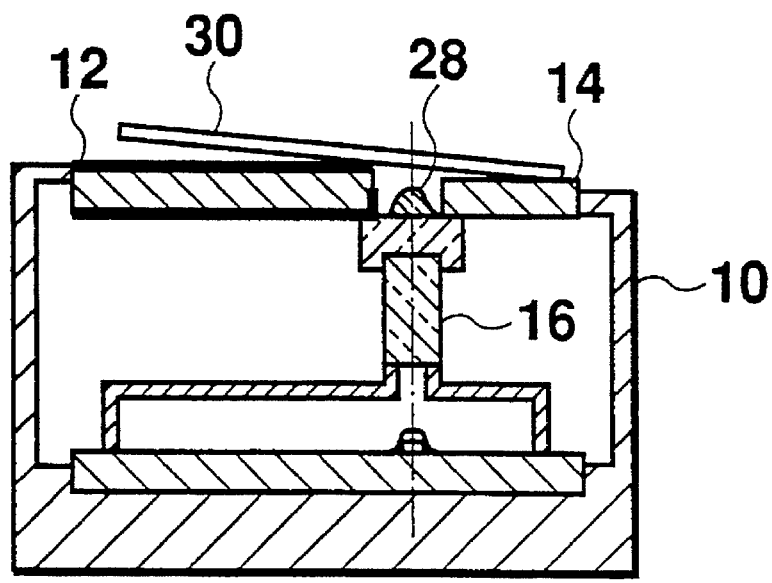
FIG. 4 is a cross-sectional view of a contact image sensor according to a fourth embodiment.

FIG. 4 is a cross-sectional view of a contact image sensor according to a fourth embodiment of this invention. As shown in FIG. 4, the fourth embodiment is characterized in that the passageway of the reflected light from the document 30, which passageway is formed between the continuous light source 12 and the document guide 14, is filled with by a transparent resin member 24 and in that the transparent resin member 24 has a projection 28 on its surface toward the document 30. Accordingly, it is possible to improve the concentration of light and to irradiate the reflected light onto the condenser lens 16 efficiently. In this embodiment, a highly thixotropic silicon resin is painted on the transparent resin member 24 and is dried to form a hemispherical projection 28.

The operation of the fourth embodiment will now be described.

Similarly to the first embodiments, the light emitted from the irradiating portion 12a of the continuous light source 12 is reflected on white areas of the document 30. As the reflected light is concentrated by the condenser lens 16 via the transparent resin member 24, the projection 28 serves to concentrate the reflected light from the document 30 and more particularly to prevent the reflected light from diffusion, thus irradiating the reflected light onto the condenser lens 16 efficiently. The operation following this is identical with that of the first embodiment and therefore its description is omitted here.

According to this embodiment, since the continuous light source 12 can be located close to the document 30, it is possible to lower the degree of brightness of the continuous light source 12. Otherwise, if the degree of brightness is kept in ordinary use, it is possible to obtain a much higher degree of illumination and hence to increase the contract. More particularly, because of the projection 28, it is possible to irradiate the reflected light from the document 30 on the condenser lens 16 efficiently. Further, since the continuous light source 12 is mounted inside the housing 10, maintenance work such as exchange of the light source can be achieved without difficulty.

Further, since the transparent resin member 24 allows the reflected light from the document 30 to pass through and fills the gap between the continuous light source 12 and the document guide 14, it is possible to prevent any foreign matter from entering from surroundings.

In this embodiment, a highly thixotropic silicon resin is painted on the transparent resin member 24 and is dried to form a hemispherical projection 28. Alternatively, a hemispherical plastic or glass member may be glued to the transparent resin member 24 with the same results.

EMBODIMENT 5

Figure 5:
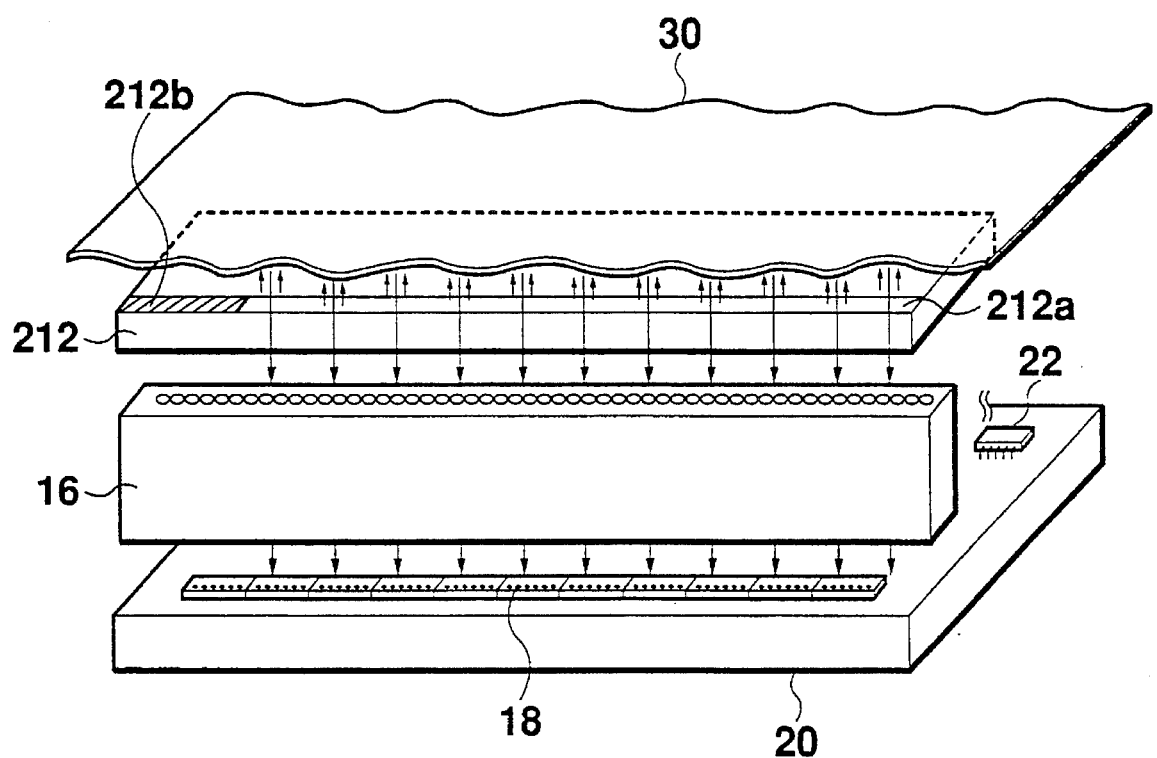
FIG. 5 is an exploded perspective view of a main portion of a contact image sensor according to a fifth embodiment.
Figure 6:
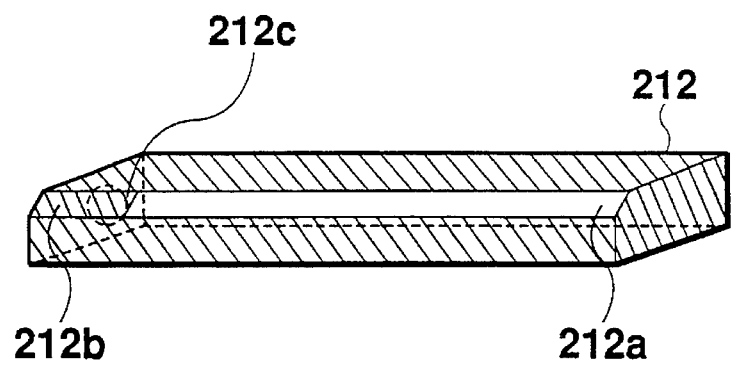
FIG. 6 is a schematic view showing a continuous light source of FIG. 5.

FIG. 5 is a fragmentary exploded perspective view of a contact image sensor according to a fifth embodiment of this invention. The end of a continuous light source 212 is painted with a light-shield coating to form a light-shield portion 212b. An arrow in FIG. 5 designates a light path. FIG. 6 is a schematic view of the continuous light source 212. As shown in FIG. 6, the continuous light source 212 has, at one end, an LED 212c as a light source. In the illustrated embodiment, the continuous light source 212 has the LED 212c at only one end. Alternatively, the continuous light source 212 may has two LEDs 212c one at each end. Further, similarly the foregoing embodiments, the continuous light source is covered over its entire area, except the irradiating portion 212a, with a black coating. This embodiment is characterized in that the light-shield portion 212b serves to restrict the light emitted from the part of the irradiating portion 12a at which part the LED 212c is situated. Accordingly it is possible to make the emitted light from the irradiating portion 212a uniform.

Figure 7:
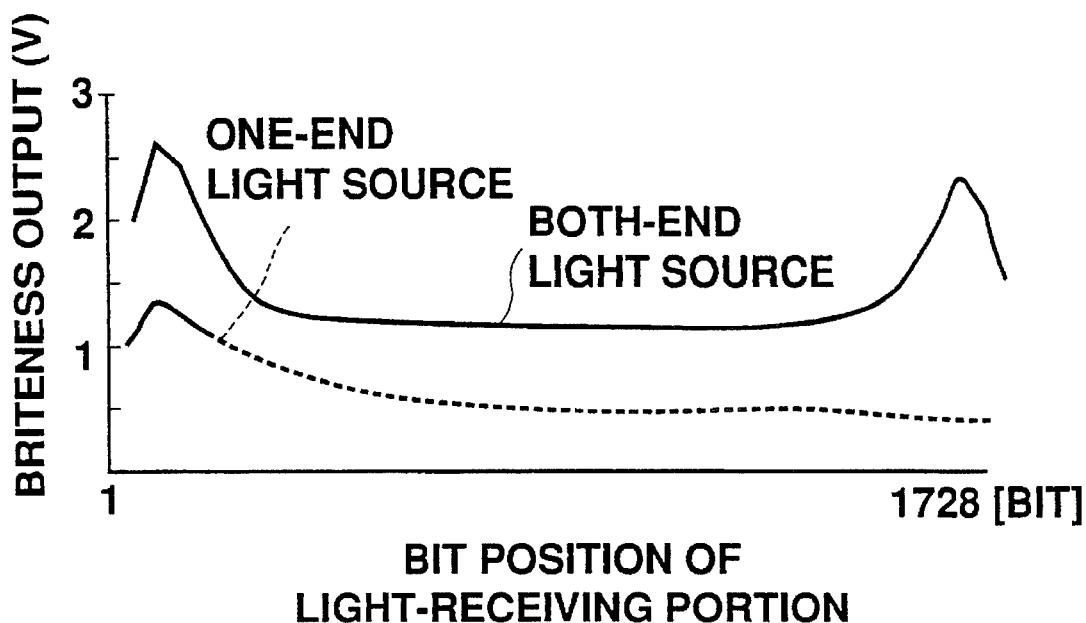
FIG. 7 is a graph showing the relationship between light received by a light-receiving portion and the voltage output as the light is photoelectrically converted.

FIG. 7 is a graph showing the relationship between voltage output values, which are obtained when the light is received and photoelectrically converted by the light-receiving portion of a sensor chip 18, and bit positions of the light-receiving portion. The degree of brightness of the light emitted from the irradiating portion 212a can be measured by causing the emitted light to reflect on the document 30 having a uniform detection surface having, for example, only white areas and then to be received by the light-receiving portion of the sensor chip 18. Namely, the degree of brightness is equivalent to an electric power value obtained from the light received by the light-receiving portion and hence can be measured. In the first embodiment, the light-receiving portion is composed of 1728 bits, and the brightness output values are obtained from the received light for respective bits.

The disadvantage of the continuous light source 212 is that the outputs on the side toward the LED 212c will be increased. In the case where the continuous light source 212 has LEDs at each end, the outputs on opposite ends will be higher than the output in the center. However, since depending on the angle of irradiation of the LED it is impossible to control the path of light emitted from the LED, the directivity of the LED cannot be secured. This is because the LED is connected close to the continuous light source member (glass or plastics) so that the light emitted from the LED will come through directly from the irradiating portion 212a.

To this end, in the fifth embodiment, the irradiating portion 212a of the continuous light source is partially covered with a light-shield coating to control the diffusion of light from the irradiating portion 212a to restrict the passage of light in the light source end portion where the LED is mounted. Accordingly it is possible to make the emitted light from the irradiating portion 212a uniform. The width of the light-shield portion 212b may be determined based on the output value shown in FIG. 7.

Figure 8:
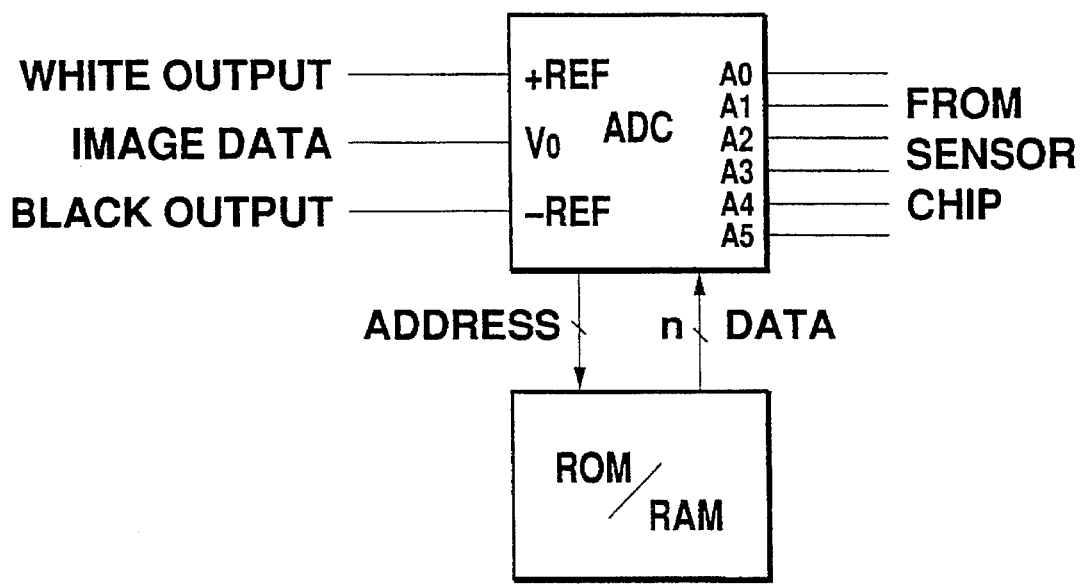
FIG. 8 is a diagram showing a circuit for performing analog-to-digital conversion and compensating a white (black) output.
Figure 9:
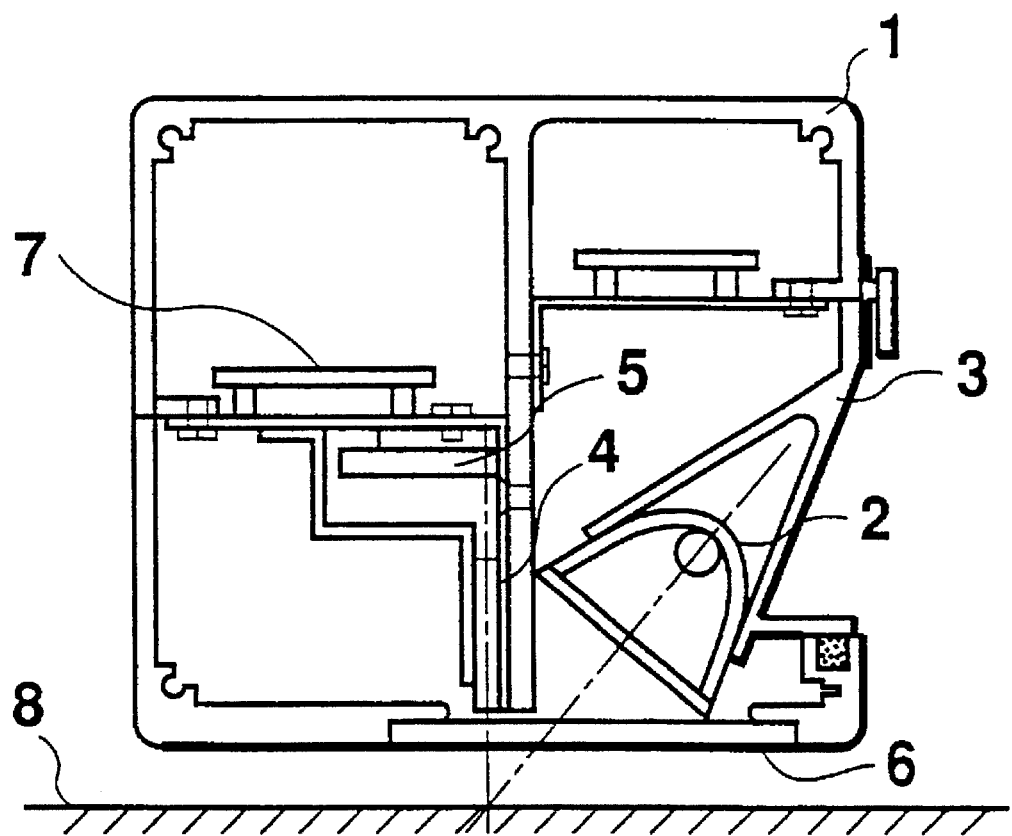
FIG. 9 is a cross-sectional view of a prior art contact image sensor.

The circuit composed of electronic components 22 of FIG. 8 performs an analog-digital conversion normally based on the output of the sensor chip 18. A correction for a black level output will be stored in ROM or RAM when the illumination of the light source is switched off. In this embodiment, since the black output at the bit position of the light-receiving portion corresponding to the light-shield portion 212b of the continuous light source 212 can be used in correcting, it is not necessary to switch on/off the light source in order to correct the black level output.

The operation of this embodiment is identical with that of the first embodiment and therefore its description is omitted here.

As mentioned above, in this embodiment, since the irradiating portion 212a toward the LED 212c is partly covered with the light-shield portion 212b, it is possible to make the emitted light from the irradiating portion 212a uniform. Similarly to the first embodiment, since the continuous light source 212 is situated close to the document 30, it is possible to lower the degree of brightness of the continuous light source 212. Alternatively, it is possible to increase the contrast to a much higher degree of illumination. Further, with the transparent resin member 24 it is possible to prevent any foreign matter from entering from the surroundings.

In this embodiment, it is assumed that light will come through from portions other than the irradiating portion 212a of the continuous light source 212. The leaked light is negligible in view of the reading precision of the sensor. In such a case, it is not necessary to provide the irradiating portion 212a with the light-shield portion.

Further, the continuous light source 212 is provided at at least one end with the LED 212c. However, alternative lighting, such as a fluorescent lamp, may be used with the same results.

As mentioned above, in the contact image sensor of this invention, since the continuous light source is situated close to the detection object, it is possible to lower the degree of brightness of the light source without deteriorating the reading precision of the sensor. Alternatively, it is possible to increase the contrast.

Further, since the passageway of the reflected light is filled with the transparent resin member, it is possible to prevent any foreign matter from entering from the surroundings.

Furthermore, since the passageway of the reflected light can be closed from the inner side of the housing, it is possible to prevent any foreign matter from entering from the surroundings.

Still further, since the continuous light source located on the detection-object side of the lens in the passageway of the reflected light is cut off at an upper portion of the end toward the lens, it is possible to prevent the detection object from jamming while it is being conveyed. Also it is possible to irradiate light onto the detection object.

In addition, since the transparent resin member occupying the passageway of the reflected light has a projection, it is possible to improve the light concentrating action so that the reflected light can be irradiated onto the lens efficiently.

Further, since the light-source-side irradiating portion of the continuous light source is designed so as to restrict the passage of light, it is possible to make the emitted light from the irradiating portion uniform.

What is claimed is:

1. A contact image sensor comprising:
   (a) at least one continuous light source for emitting light to a detection object while the detection object is conveyed along a guide;
   (b) a lens for gathering the light reflected by the detection object;
   (c) a sensor board on which a number of light receiving portions for receiving the light from said lens are arranged; and
   (d) a housing for supporting said continuous light source, said lens and said sensor board;
   (e) said continuous light source having an external non-light-emitting supporting surface portion which forms at least part of the support surface for said detection object while the detection object is being conveyed along said guide and having an external light irradiating surface portion adjacent to said non-light-emitting supporting surface portion and which is positioned immediately adjacent to the detection object while the detection object is being conveyed along said guide.

2. A contact image sensor according to claim 1, wherein said continuous light source is coated to eliminate emission of light from said non-light-emitting supporting surface portion at all portions except for an irradiating surface portion at one end toward the detection object with respect to said lens.

3. A contact image sensor according to claim 1, where a passageway of the reflected light from the detection object to said lens is filled with a transparent resin member.

4. A contact image sensor according to claim 3, wherein said transparent resin member is fixed to said continuous light source, said guide and said lens.

5. A contact image sensor according to claim 3, wherein said transparent resin member has a projection on its detection-object-side surface.

6. A contact image sensor according to claim 1, wherein said continuous light source is exposed from said housing.

7. A contact image sensor according to claim 1, wherein said guide is located on the detection-object-discharge side of said continuous light source.

8. A contact image sensor according to claim 7, wherein said guide serves to ensure that a step height between said guide and said transparent resin member is smaller than a step height between said continuous light source and said transparent resin member.

9. A contact image sensor according to claim 1, wherein a passageway of the reflected light from the detection object to said lens is closed by a glass plate from the inner side of said housing.

10. A contact image sensor according to claim 9, wherein said glass plate fixes said continuous light source and said lens.

11. A contact image sensor according to claim 1, wherein said continuous light source is located on the detection-object-discharge side of said lens and said irradiating surface portion is provided by machining an upper portion of the detection-object-discharge-side end of said continuous light source.

12. A contact image sensor according to claim 5, wherein said projection is an integral part of said transparent resin member.

13. A contact image sensor according to claim 5, wherein said projection is a semi-spherical plastic or glass member.

14. A contact image sensor according to claim 1, wherein a part of said irradiating surface portion of said continuous light source comprises a light-shield portion, said light shield portion restricting the light passing through light source side of said irradiating surface portion of said continuous light source.

15. A contact image sensor according to claim 14, wherein light passing through said irradiating surface portion is restricted by coating said irradiating surface portion of said continuous light source with a light-shield paint.

* * * * *